US010127921B2

(12) United States Patent
Iyer et al.

(10) Patent No.: US 10,127,921 B2
(45) Date of Patent: Nov. 13, 2018

(54) ADAPTIVE CORRECTION OF LOUDSPEAKER USING RECURRENT NEURAL NETWORK

(71) Applicant: Harman International Industries, Incorporated, Stamford, CT (US)

(72) Inventors: Ajay Iyer, Murray, UT (US); Douglas J. Button, Simi Valley, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 67 days.

(21) Appl. No.: 15/339,045

(22) Filed: Oct. 31, 2016

(65) Prior Publication Data

US 2018/0122401 A1 May 3, 2018

(51) Int. Cl.

| | |
|---|---|
| ***H04B 15/00*** | (2006.01) |
| ***H04R 3/00*** | (2006.01) |
| ***G10L 21/0264*** | (2013.01) |
| ***G10L 25/30*** | (2013.01) |
| ***H04R 3/02*** | (2006.01) |
| ***H04R 3/04*** | (2006.01) |
| *H04R 29/00* | (2006.01) |

(52) U.S. Cl.

CPC .......... *G10L 21/0264* (2013.01); *G10L 25/30* (2013.01); *H04R 3/02* (2013.01); *H04R 3/04* (2013.01); *H04R 3/007* (2013.01); *H04R 29/001* (2013.01)

(58) Field of Classification Search

CPC ....... G10L 21/0264; G10L 25/30; H04R 3/02; H04R 3/04; H04R 29/001; H04R 3/007

USPC .......................................... 381/94.1, 94.2, 96

See application file for complete search history.

(56) References Cited

U.S. PATENT DOCUMENTS 5,694,476 A 12/1997 Klippel
6,601,054 B1 7/2003 Lo et al.
7,593,535 B2 * 9/2009 Shmunk .................. H04R 3/04 381/59
2007/0265841 A1 11/2007 Tani et al.
2008/0037804 A1 * 2/2008 Shmunk .................. H04R 3/04 381/96
2011/0194685 A1 * 8/2011 van de Laar ......... H04M 9/082 379/406.01
2016/0323685 A1 11/2016 Iyer
2017/0303039 A1 * 10/2017 Iyer ...................... G05B 13/027
2017/0323653 A1 * 11/2017 Hassan al Banna .... G10L 15/20

OTHER PUBLICATIONS

Low, S. et al., "A Neural Network Approach to the Adaptive Correction of Loudspeaker Nonlinearities", Oct. 1993, 26 pgs.
Caroline Fox, "Artificial neural networks for loudspeaker modelling and fault detection," Jan. 1, 2006, ISBN: 978-1-303-20194-3, 260 pages, URL:http://orca.cf.ac.uk/id/eprint/54555.
Ronald J. Williams, et al., "A Learning Algorithm for Continually Running Fully Recurrent Neural Networks," Neural Computation, vol. 1, No. 2, Jun. 1, 1989, pp. 270-280, ISSN: 0899-7667.

* cited by examiner

*Primary Examiner* — Khai N Nguyen
(74) *Attorney, Agent, or Firm* — Brooks Kushman, P.C.

(57) ABSTRACT

An audio system is described that corrects for linear and nonlinear distortions. The system can include a physical loudspeaker system responsive to an audio input signal, an adaptive circuit, e.g., with a recurrent neural network, to correct for non-linear distortions from the loudspeaker.

14 Claims, 6 Drawing Sheets

ADAPTIVE CORRECTION OF LOUDSPEAKER USING RECURRENT NEURAL NETWORK

TECHNICAL FIELD

Aspects of the present disclosure provide loudspeaker correction systems and methods, e.g., which use a feedback and neural network connected to a loudspeaker in an audio system in a vehicle, home or other suitable environment.

BACKGROUND

Loudspeakers may have nonlinearities in their performance that degrade the sound quality produced by the loudspeaker. When using a moving coil to produce sound, nonlinearities may be produced by voice coil inductance change with cone excursion, coil heating effects, Doppler distortion, suspension spring forces, and non-linear spring forces. Existing nonlinear correction schemes use a "physical model" based or a "low-complexity black box model" based corrector to decrease the nonlinear distortion produced by the loudspeaker.

SUMMARY

As described herein a modeling system or an audio processing system is described. The system may include a physical system including a loudspeaker configured to produce audio in response to an audio input signal, an audio processor to output a processed signal to the loudspeaker, the audio processor including a recurrent neural network to correct for non-linear distortions from the loudspeaker; and an adaptive feedback system receiving an audio output from the loudspeaker and comparing the received audio output to a target to provide correction parameters to the recurrent neural network, the adaptive feedback system is configured to predict performance of the loudspeaker receiving an output from the first recurrent neural network and to provide corrective parameters to the recurrent neural network.

In an example embodiment, the recurrent neural network receives the audio input signal and outputs a corrected audio signal to the loudspeaker.

In an example embodiment, the recurrent neural network outputs a drive signal loudspeaker.

In an example embodiment, the audio processor applies a target linear transfer function to the input signal to produce the processed signal for the loudspeaker.

In an example embodiment, the recurrent neural network receives the audio input signal and outputs a desired output signal.

In an example embodiment, a summing circuit to sum the system output and the desired output signal to produce an error signal that is received as a control signal by both the recurrent neural network.

In an example embodiment, the recurrent neural network is a precorrector.

In an example embodiment, the recurrent neural network is trained using an error signal between an output from the loudspeaker and an output from a forward model.

In an example embodiment, the audio input signal is a multitone, sweep, overlapped log sweeps, and/or music signal.

As described herein, a modeling system is used to predict the performance of an audio system and correct non-linear and linear distortion in the audio system. The audio modeling system includes a physical system including a loudspeaker configured to produce audio in response to an audio input signal, a first recurrent neural network to correct for non-linear distortions from the loudspeaker, and a second recurrent neural network to predict performance of the loudspeaker receiving an output from the first recurrent neural network and to perform corrections on the first recurrent neural network.

In an example, the first recurrent neural network receives the audio input signal and outputs a corrected audio signal to the second recurrent neural network and the second recurrent neural network outputs a cascade output signal.

In an example, the first recurrent neural network outputs the corrected audio signal to a loudspeaker system model/actual loudspeaker that outputs a system output.

In an example, a target linear transfer function that receives the audio input signal and outputs a desired output signal.

In an example, a summing circuit to sum the system output and the desired output signal to produce an error signal that is received as a control signal by both the first recurrent neural network and the second recurrent neural network.

In an example, the first recurrent neural network is a precorrector and the second recurrent neural network is a forward model RNN.

In an example, the precorrector is trained starting from the forward model RNN and correcting the forward model RNN using an error signal from the target linear transfer function to the forward model RNN.

In an example, the forward model RNN is trained using an error signal between an output from the physical system and an output from the forward model RNN.

In an example, the audio input signal is a multitone, sweep, overlapped log sweeps, and/or music signal.

An audio system may include a loudspeaker that includes non-linear distortion and linear distortion based on an audio signal input to the loudspeaker; non-linear distortion removal parameters developed from a first recurrent neural network to correct for non-linear distortions from the loudspeaker and a second recurrent neural network to predict performance of the loudspeaker receiving an output from the first recurrent neural network and correct parameters of the first recurrent neural network; and circuitry to apply the non-linear distortion removal parameters to the audio signal in the loudspeaker.

In an example, the circuitry is in an amplifier that sends an audio signal corrected by the non-linear distortion removal parameters to the loudspeaker to reduce non-linear distortions at the loudspeaker in response to the audio signal.

In an example, the non-linear distortion removal parameters are in an audio signal correction matrix that are mathematically applied to an audio signal input to the amplifier that outputs a corrected audio output signal to the loudspeaker.

In an example, the matrix includes linear distortion correction parameters that are mathematically applied to the audio signal input to the amplifier that outputs the corrected audio output signal to the loudspeaker.

In an example, the first recurrent neural network receives the audio input signal and outputs a corrected audio signal to the second recurrent neural network and the second recurrent neural network outputs a cascade output signal.

In an example, the first recurrent neural network outputs the corrected audio signal to a loudspeaker system model that outputs a system output.

In an example, a target linear transfer function receives the audio input signal and outputs a desired output signal.

In an example, a summing circuit to sum the system output and the desired output signal to produce an error signal that is received as a control signal by both the first recurrent neural network and the second recurrent neural network.

In an example, the first recurrent neural network is a precorrector and the second recurrent neural network is a forward model RNN.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical/operational implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and instructions (e.g., software) which co-act with one another to perform operation(s) disclosed herein. In addition, any one or more of the electric devices may be configured to execute a computer-program that is embodied in a computer readable medium that is programmed to perform any number of the functions and features as disclosed. The computer readable medium may be non-transitory or in any form readable by a machine or electrical component.

Aspects disclosed herein may provide for correction of loudspeaker performance. Correction of loudspeaker performance may correct loudspeaker nonlinearities. The present systems and methods may use adaptive correction of loudspeakers using neural networks, e.g., a recurrent neural network (RNN). RNNs may be black box models that are extremely useful for modeling nonlinear dynamical systems, e.g., a loudspeaker or loudspeaker system. Furthermore, RNNs have excellent generalization capabilities. Hence, an adaptive correction scheme based on RNNs and real-time feedback is described. A RNN can produce a corrector model or corrector parameters to correct the highly nonlinear aspects of loudspeakers, e.g., break up modes, air path distortion, compression chamber and phasing plug distortion, port nonlinearities, hysteresis, thermal effects and/or other nonlinear effects.

Figure 1:
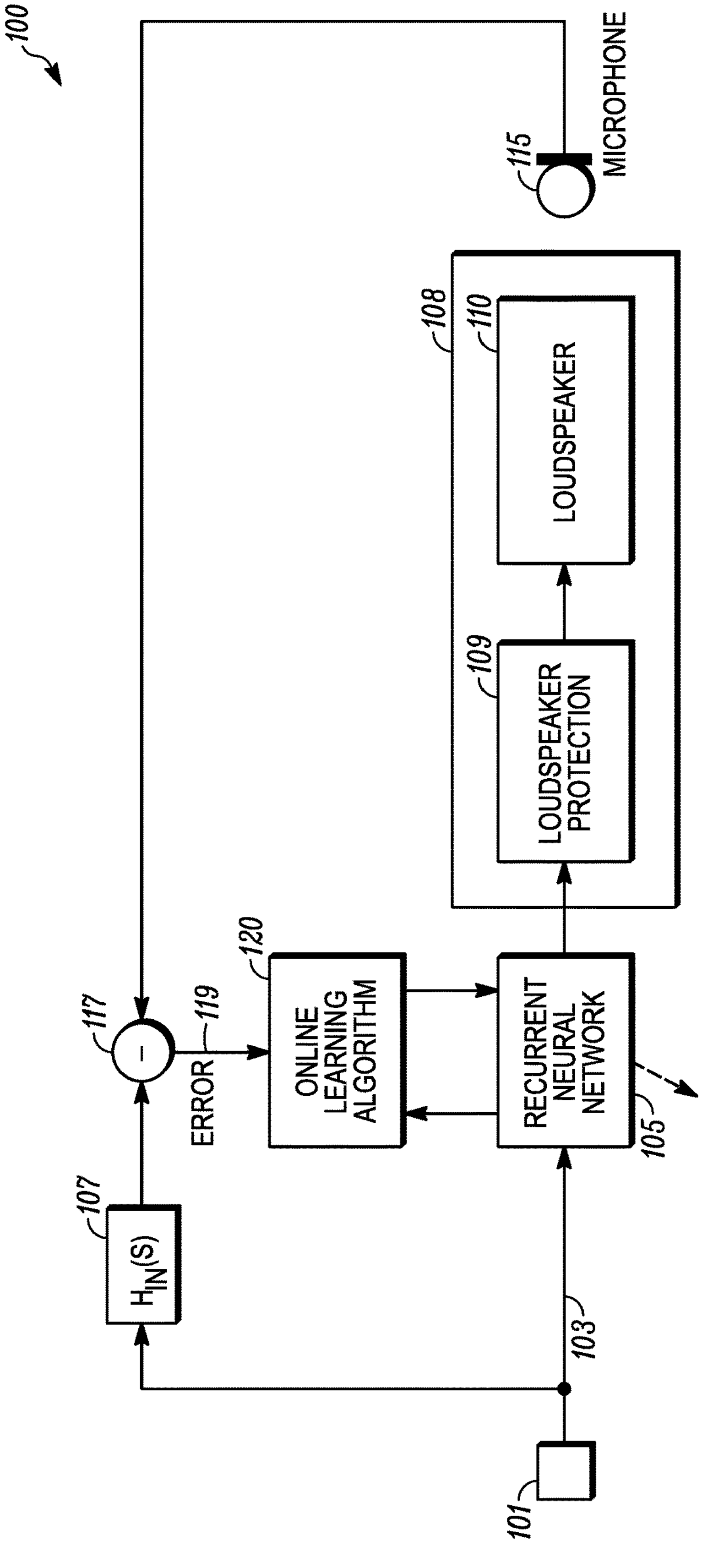
FIG. 1 shows a schematic view of an audio system according to an embodiment.

FIG. 1 shows an audio system 100 to sense and produce correction parameters to correct nonlinearities in a loudspeaker 110. An audio signal source 101 produces an audio signal 103 that is input into a RNN 105 and input into a transfer function 107. The audio signal source 101 may be a device that plays recordings of music or a tone generator. The audio source 101 can output the audio signal 103 that contains multiple tones, e.g., pitches, quality and strength, and moves through a plurality of frequencies. The audio source 101 can produce an audio signal 103 that includes at least two tones simultaneously moving through an audio spectrum to create a spread of intermodulation. The intermodulation may include an amplitude modulation of signals containing two or more different frequencies, caused by nonlinearities in a system 100, e.g., in the loudspeaker 110. The intermodulation between each frequency component of the audio signal 103 will form additional signals at frequencies that are not just at harmonic frequencies (integer multiples) of either, like harmonic distortion, but also at the sum and difference frequencies of the original frequencies and at multiples of those sum and difference frequencies. The audio signal 103 may be spectrally dense and changes over time. The audio signal 103 may last a duration that allows the loudspeaker 110 to produce sound that may contain an irregularity due to a linear irregularity or nonlinear irregularity, e.g., greater than five seconds, up to about 10 seconds or more. In an example, the audio signal 103 may include music, overlapped log sweeps, e.g., two tones moving through the spectrum at the same time to create a spread of intermodulated input, and a sweep; all at a high voltage input level and a mid-level voltage input level combined into a 6 second long stimulus. The voltage input level can be the signal input into the loudspeaker.

The RNN 105 is an artificial neural network that may be programmed into a computing device. The RNN 105 is a machine learning device that uses artificial neurons that are interconnected to perform non-linear statistical data modeling or non-linear learning of correction parameters to match an actual input to a desired input. The RNN 105 includes internal units that form a directed cycle, which produces an internal state of the network which allows it to exhibit dynamic temporal behavior. Such a directed cycle will include feedback loops with the RNN itself. The RNN may use its internal memory to process arbitrary sequences of inputs, e.g., the audio signal 103. The RNN may be a bi-directional RNN or a continuous-time RNN. The RNN 105 also receives new parameters from the learning algorithm 120 and sends old parameters back to the learning algorithm 120. The RNN forwards a corrected audio signal to a loudspeaker assembly 108, which can include loudspeaker protection circuitry 109 and the loudspeaker 110.

The loudspeaker protection circuitry 109 acts as a protector of the loudspeaker 110 from the audio signal output from the RNN 105. The RNN 105 may, at times, alter the audio signal 103 it receives from the audio source 101 to produce an output audio signal that may damage the loudspeaker 110. The circuitry 109 may include a band pass filter, an amplitude clipping circuit, or combinations thereof.

The loudspeaker 110 may be a single loudspeaker or a loud speaker array. The loudspeaker 110 is a device under test to determine the linear and nonlinear irregularities. The loudspeaker 110 may output distortions from the input electrical audio signal in the broadcast audio. Signal distortion generated by the loudspeaker 110 may be related to the geometry and properties of the material used in loudspeaker design. Such distortions may be in all loudspeakers. Such audio distortions may result from an optimization process balancing perceived sound quality, maximal output, cost, weight, and size. Sources for linear distortion include the coil, the cone, the suspension, electrical input impedance, acoustical load, mechanical vibration damping, enclosure effects, and room effects. Sources for nonlinear effects include, but are not limited to, nonlinear force factors and inductance factors at any of the voice coil, signal path, and coil magnet, nonlinear suspension, nonlinear losses of the loudspeaker mechanical and acoustic system, nonlinear airflow resistance with a vented loudspeaker, partial vibration of radiator's effect, Doppler effects, and nonlinear sound propagation in a horn. The present system 100 can determine these effects and output correction parameters to reduce the effect of the nonlinear loudspeaker distortion.

A microphone 115 is positioned at the output of the loudspeaker 110 to detect the output from the loudspeaker 115 and output a signal to a summing circuit 117. In an example, the signal from the microphone 115 can represent the sound pressure level in the room in which the loudspeaker 110 is located. The sound pressure level may include linear irregularities and nonlinear irregularities from the loudspeaker 110.

The transfer function 107 operates to convert the audio signal 103 from the audio source 101 to a desired signal that should be output from the loudspeaker 110. The transfer function 107 may be a linear filter that describes a distortionless response of the loudspeaker. In an example, the transfer function 107 may be transfer function of the loudspeaker at low input levels, whereat a distortion is low or non-detectable. This distortionless response as the transfer function operates as a target response for the loudspeaker over a wide range of inputs. The summing circuit 117 produces an error signal 119 by subtracting the microphone signal from the transfer function signal. The error signal is fed to a learning algorithm 120. The learning algorithm 120 produces new parameters to input into the RNN 105. The learning algorithm 120 can be stored in a system remote from the RNN 105 and speaker assembly 108. In an example, the learning algorithm 120 is part of a server that is accessible over a network. The new parameters can be weights of the RNN. The input connections to various neurons of the RNN 105 may be weighted. Weighting of the inputs is estimated as part of the learning algorithm and training process. The RNN 105 uses the new parameters to learn new changes to the input audio signal to correct for the sensed loudspeaker irregularities. Irregularities may be output from the loudspeaker, e.g., at high gains or volumes.

Figure 2:
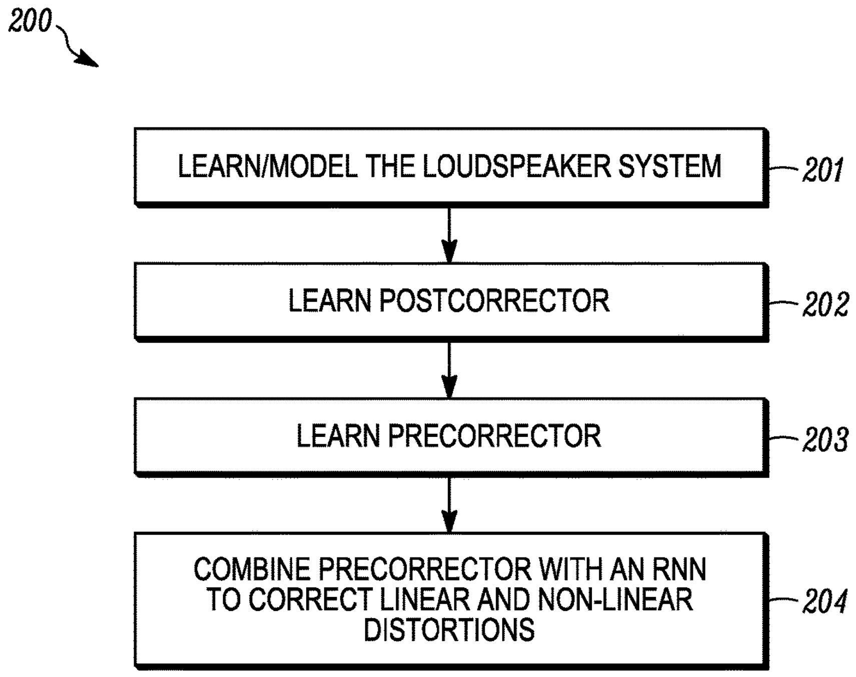
FIG. 2 shows a schematic view of an audio system according to an embodiment.

FIG. 2 shows an audio loudspeaker correction method 200. At 201, the model of the loudspeaker system is produced. This model can be a forward model of a target physical system, which may include a compression driver, a horn driver, a woofer driver, or combinations thereof. Other speaker drivers may also be modeled. The forward model may also take include account the power test results as well. This results in a RNN forward model. The RNN forward model predicts the linear and nonlinear outputs of the physical loudspeaker system in response to a stimulus, e.g., an input signal. The RNN forward model may be more efficient than taking actual physical measurements at the loudspeaker. Additionally, the RNN forward model provides analytically differentiable elements that allow gradients through a range of these elements. This provides control and correlation of the error and the parameters of the precorrector.

At 202, a postcorrector is learned. A postcorrector may correct for distortions or irregularities from the loudspeaker, e.g., from linear irregularities. The postcorrector may be a RNN that learns an initial state for a precorrector. The postcorrector may predistort an audio signal being supplied to the loudspeaker or the RNN forward model from step 201. The postcorrector may provide starting parameters for a modeling system using an RNN to determine correction parameters for a loudspeaker to correct for linear distortions and nonlinear distortions.

At 203, a precorrector is learned. A precorrector may correct for distortions or irregularities from the loudspeaker, e.g., from nonlinear irregularities. The precorrector may be a RNN that learns the nonlinear irregularities. The precorrector may use feedback from a loudspeaker to develop. The precorrector operates to fix the forward model that models the loudspeaker.

At 204, the precorrector and the postcorrector are combined in an RNN. This combination operates to fine tune the precorrector and the forward model, which each are included in the RNN. The input audio is sent into the precorrector to output a predistorted audio input signal that is input into the RNN as determined in step 202. The output signal is generated using the RNN output. The precorrector and the RNN may receive an error signal from a comparison of a system output and a desired output. The system output is from a loudspeaker model system/actual loudspeaker, which receives its input from the precorrector. The desired output is from the audio input after it passes through a linear, desired output transfer function.

Both the precorrector, RNN and the postcorrector can be electrical circuits or dedicated, specific instructions run on a machine, which when the instructions are loaded form a specific, dedicated machine. The precorrector and postcorrector can both include RNNs. A RNN may have a plurality of layers, with each layer including a plurality of neurons. Each of these neurons can include a weight to appropriately weight the incoming data to that neuron. A neuron may receive multiple data inputs either from inputs to the system at the first layer or from neurons at preceding layers. A recurrent neural network may also feed outputs from a layer to itself or a preceding layer.

Figure 3:
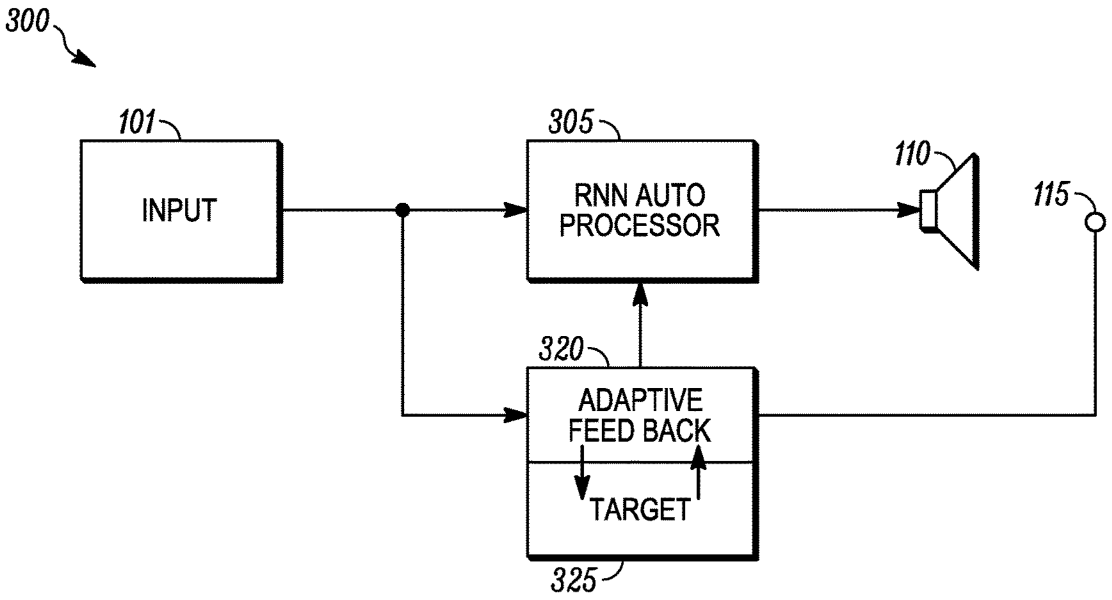
FIG. 3 shows a schematic view of an audio system according to an embodiment.

FIG. 3 shows a forward model learning system 300 to develop a forward model for use in a precorrector. The stimulus to this system 300 is an audio signal, e.g., audio source 101. The input signal 103 may be a signal that includes multiple tones, music and sweep through various frequencies and times. The input signal should be a dense signal that moves to different audio tones. A physical system 301 is included as either a transfer function or an actual physical loudspeaker system. The physical system 301 may model a horn driver, a compression driver, a planar width transducer and the like, depending on the loudspeaker system being modeled. The physical system model 301 output a system output signal 302. The RNN forward model 304, that is, the virtual driver for the loudspeaker system, also receives the audio input signal 103. The RNN forward model 304 outputs a model output signal 305. A summing circuit 306 receives the model output signal 305 and the system output signal 302 and then compares the two signals to produce an error signal 307. The error signal 307 is fed as a control input into the RNN forward model 304. The RNN forward model 304 uses the error signal 307 to correct the model output signal 305. The process can be repeated for multiple input signals 103 from the source 101. The forward model learning signal system 300 produces forward model parameters.

Figure 4:
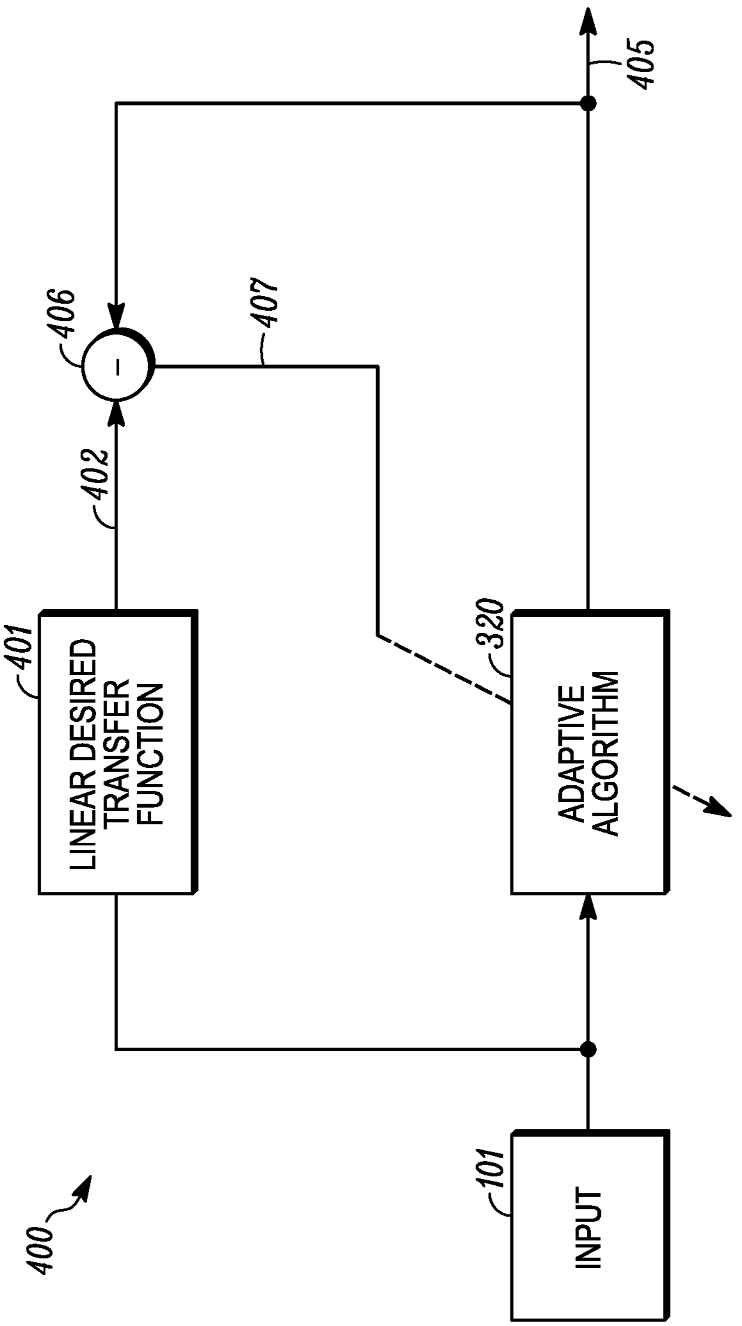
FIG. 4 shows a method for adaptive correction of loudspeaker performance.

FIG. 4 shows a postcorrector learning system 400. The postcorrector is useful for correcting for certain offline environments where the distortions are known, e.g., linear distortions. Like in the forward learning model, the audio source 101 inputs the audio test signal 103. The signal 103 is input into both a desired linear target transfer function 401 and to the adaptive correction algorithm 320. The adaptive correction algorithm 320 can be part of a RNN. The summing circuit 406 also receives the target output signal 402 from the linear target transfer function 401 and the output signal 405 from the signal output to the loudspeaker. The summing circuit compares the target output signal 402 to the postcorrected output signal 405 to produce an error signal 407. The error signal 407 is fed as a control input parameter (s) into adaptive algorithm 320. The adaptive algorithm 320, which can act as a RNN postcorrector, changes its correction operations on the output signal of the forward model to produce the postcorrected output signal 405. As described herein the final parameters from the adaptive algorithm 320 can be used as initial conditions for a precorrector.

Figure 5:
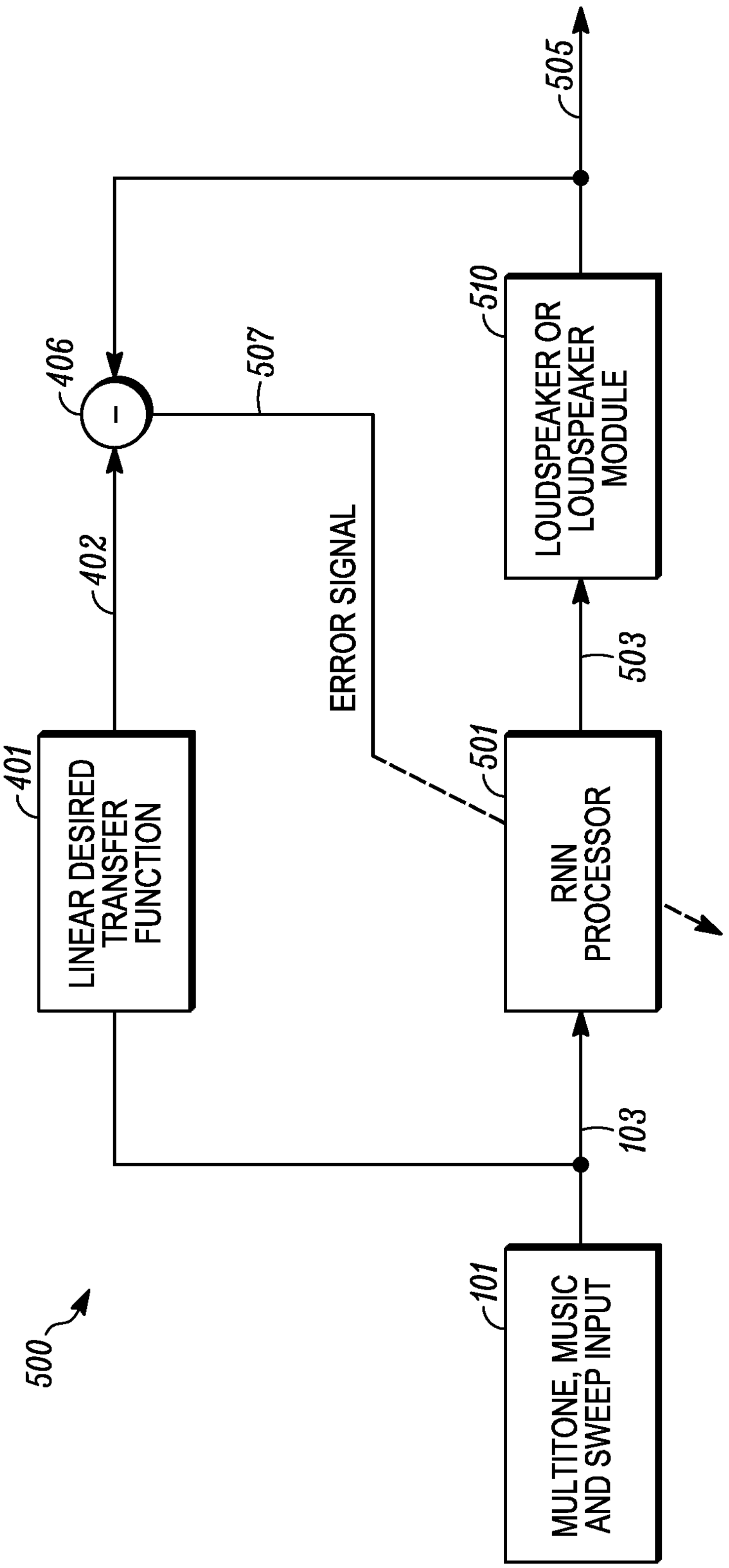
FIG. 5 shows a schematic view of a forward modeling system for an audio system according to an embodiment.

FIG. 5 shows a precorrector learning system 500 that uses a RNN processor 501 and a loudspeaker or loudspeaker model 510 connected in cascade to correct for both linear and nonlinear distortions in a loudspeaker system. The RNN processor 501 can be the final result from the RNN postcorrector 404, e.g., the parameters of the RNN postcorrector 404 are input as the starting parameters for the RNN processor 501. As shown in system 500, the processor 501 corrects the audio input signal 103 before it is fed to the loudspeaker or loudspeaker 510. The processor 501 receives an error signal 507 from the summing circuit 406. The error signal 507 is based on the difference between the output 402 from the target linear transfer function 401 and the output 505 from the loudspeaker model 510. The loudspeaker model 510 receives the output 503 from the RNN processor 501. The loudspeaker model 510 applies the parameters determined in system 300 to produce the output 505. The loudspeaker model 510 is operating on a predistorted signal 503 from the RNN processor 501. The processor 501 operates to correct any distortion in the loudspeaker model 510.

The above systems 300-500 can be used together to set the precorrector or the RNN processor 501 and the loudspeaker model 510. In an example embodiment, the loudspeaker model is a virtual model that can be determined with a generalized training input pattern. The input 101 outputs an audio signal 103, e.g., music, overlapped log sweeps (two tones moving through the spectrum at the same time to create a spread of intermodulation), and a sweep; all at a high and a mid level combined into a 6 second long stimulus. Thus, the loudspeaker model also learns thermal compression to some extent. The generalized training pattern includes a pair of input and a single measurement on the loudspeaker or loudspeaker model.

The adaptive algorithm 320 can also be set using the generalized training input pattern as the input signal. The adaptive algorithm 320 results from training using an initial RNN processor 501. The RNN processor 501 can be set using the generalized training input pattern in cascade with the loudspeaker model. This initial trained precorrector 501 and forward model 304 serve as good starting points for correcting a specific stimulus of interest, e.g., a multitone input to a specific loudspeaker.

These initials models of trained precorrector 501 and forward model 304 are adapted in a real-time batch fashion wherein first the forward model is trained on the precorrected input and the resulting output measurement from a previous iteration. The forward model is trained for few iterations with the generalized training sequence and the previous iteration measurement as inputs. This is done to prevent the forward model from forgetting the generalized training sequence but simultaneously improving the performance on the multitone input signal.

The precorrector 501 is then trained for few iterations so as to minimize the error between the output of the cascade model and desired target. Then a measurement is made on the actual physical system with the output of the trained precorrector 501 as input to the actual physical system.

The resulting performance is analyzed. Various statistical analysis of the resulting performance may be used. For example, an error metric may be determined using the normalized root-mean-square error or a standard error. Another example, of analyzing the performance may use a comparison of the harmonic/intermodulation distortion products between the cascade output and the output without precorrection. This performance metric shows the amount of correction achieved using precorrection.

The above process can be repeated until an acceptable performance is reached.

Some examples use at least two RNN to model and test a loudspeaker system's performance. The use of multiple RNNs decouples the precorrector and forward model to achieve efficiencies in the present algorithms. In an example, the multiple RNNs may be combined into a single RNN that would have an intermediate output which would replicate the precorrector output and a final output which would be the cascade output. Such an RNN would have feedback connections and would be less efficient to train.

Figure 6:
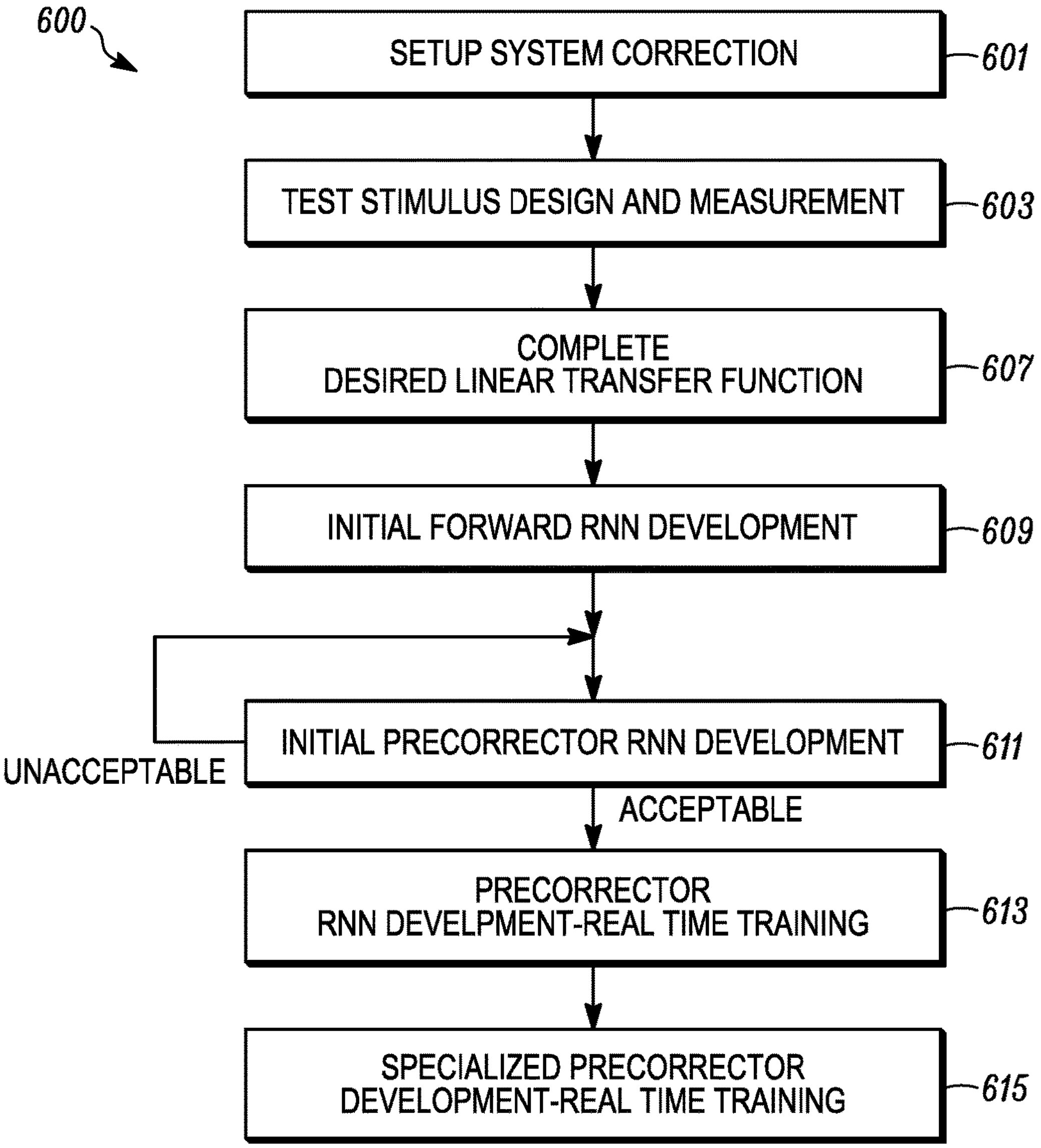
FIG. 6 shows a schematic view of a postcorrector learning scheme for an audio system according to an embodiment.

FIG. 6 shows a loudspeaker correction method 600. At 601, the setup system correction is performed. The setup system correction operates to initialize the parameters for the RNNs, e.g., by equalizing the response of the RNN using filters. The setup system correction may calibrate the sound levels, e.g., the output from a sound card or a loudspeaker, to the microphone input, e.g., microphone 115 (FIG. 1). In an example the sound level at the sound card. For example, the audio source 101 is the same as that output from the loudspeaker 110 or picked up by the microphone 115.

At 603, the stimulus signal is tested as to its design and resulting measurement. A stimulus signal is designed and a loudspeaker system response is measured. The stimulus signal may be the audio signal 103 from the audio source 101. The system response is analyzed for its distortion, linear or nonlinear to the stimulus signal. If the stimulus signal is enough to produce a corrector response, then the stimulus signal is selected. If the stimulus signal will not produce a corrector response, then a new stimulus signal is selected. Once the stimulus signal is selected, a general stimulus is selected. The loudspeaker system response to the general stimulus signal is measured. If the general stimulus signal does not produce a distortion substantial enough to train the corrector, then a new general stimulus is selected and the process repeats. If the general stimulus signal can produce a distortion substantial enough to train the corrector, then the process proceeds.

At 607, a desired linear transfer function is computed. The low-level system response is measured and used to set the low level response as the target response in an RNN. Low level is a low level signal that allows a system with both linear and non-linear distortion to act as merely as a linear system. The target response is used to generate a desired system response for both the special stimulus and the general stimulus. The general stimulus may be a combination of multiple stimuli such as music, multitones, sweeps, and overlapped log sweeps. The general stimulus ensures that the precorrector and forward model work for a variety of levels and frequency spectra. The optional special stimulus may usually consist of a restricted set of stimuli. Restricted in the sense of level (high/medium) or sparse/dense spectrum like a multitone. The general stimulus reduces the average error of the precorrector across a broad range of stimuli while the special stimulus allows the precorrector to specialize and further reduce the error for the specific stimulus. In the real-time case, the general precorrector can be used as starting point/periodic reset point using which the precorrector "specializes" and precorrects better the stimulus being used. The low level response system response is set as the desired target response for the RNN precorrector.

At 609, the initial forward model RNN is developed. The architecture for the RNN of the forward model is selected. The forward model is trained using the general stimulus as input and the corresponding system response as the output. The forward model RNN is computed using the general and special stimulus. If the performance of the forward model RNN is not acceptable this step repeats. If the performance of the forward model RNN is acceptable, then the process 600 moves to the step 611. The performance of the forward model is evaluated using the metrics outlined herein. In the case of the forward model, the distortion products between the measured system output and model output shows the match and accuracy of the model.

At 611, the initial precorrector RNN is developed. The architecture for the precorrector RNN is selected. A postcorrector RNN is trained using the forward model output as the input and the desired system response as the output of the postcorrector RNN. The trained postcorrector RNN is set as the initial precorrector RNN. If the performance is not acceptable, then a new architecture for the precorrector RNN is selected and the step 611 repeats. If the performance is acceptable, then the precorrector RNN is further trained using multiple iterations using the general stimulus. The precorrector RNN is then set in a cascade configuration with the forward model RNN. The performance of the cascade configuration is tested based on the cascade output. If the cascade configuration of the precorrector RNN and the forward model RNN are not acceptable, then the process performs additional precorrector RNN training using multiple iterations using the general stimulus. If the cascade configuration performs acceptably, then the process 600 moves to step 613. At 613, real-time training of the precorrector RNN is performed. The system response is measured using a general stimulus that is precorrected by the precorrector RNN. The measured response can be statistically evaluated, e.g., using normalized root-mean-square error.

At 615, additional real-time training of the precorrector RNN is performed using a specialized stimulus that is precorrected by the precorrector RNN. The parameters from step 613 can be used as initial conditions for the precorrector RNN. In an example, this step is optional.

Figure 7:
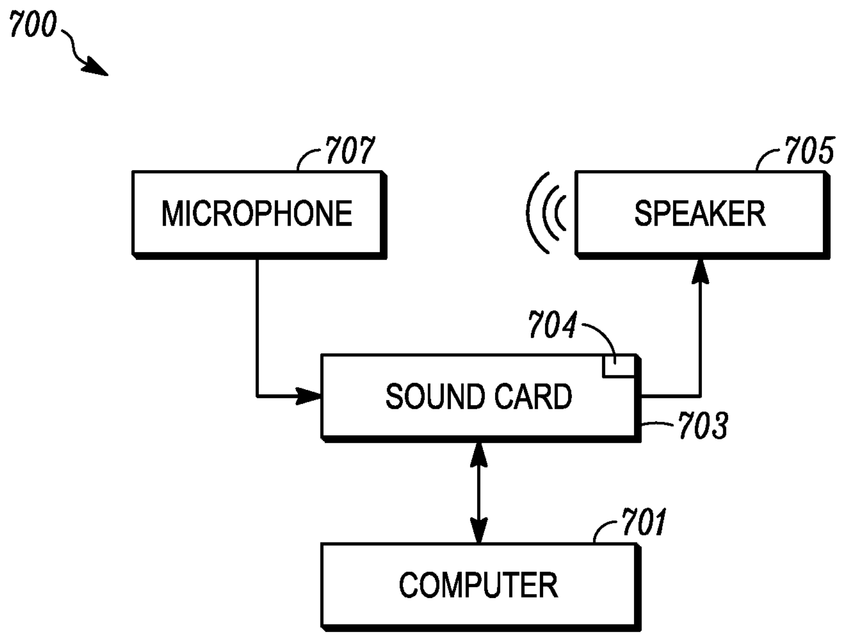
FIG. 7 shows a schematic view of a precorrector of the forward model for an audio system according to an embodiment.

FIG. 7 shows a system 700 for using the nonlinear distortion correction parameters and the linear correction parameters developed by the RNNs described herein. A computer 701 may store the nonlinear distortion correction parameters and the linear correction parameters in a memory. The parameters may be stored in a matrix 704 that can be loaded into a sound card 703. The matrix 704 can be applied to an audio signal sent to a speaker 705 to correct for nonlinear distortions and linear distortions of the loudspeaker 705. The soundcard 703 may receive an audio signal from a microphone 707, which may also suffer from nonlinear distortions and linear distortions. The sound card 703 may apply a matrix 704 to the audio signal received from the microphone 707.

Figure 8:
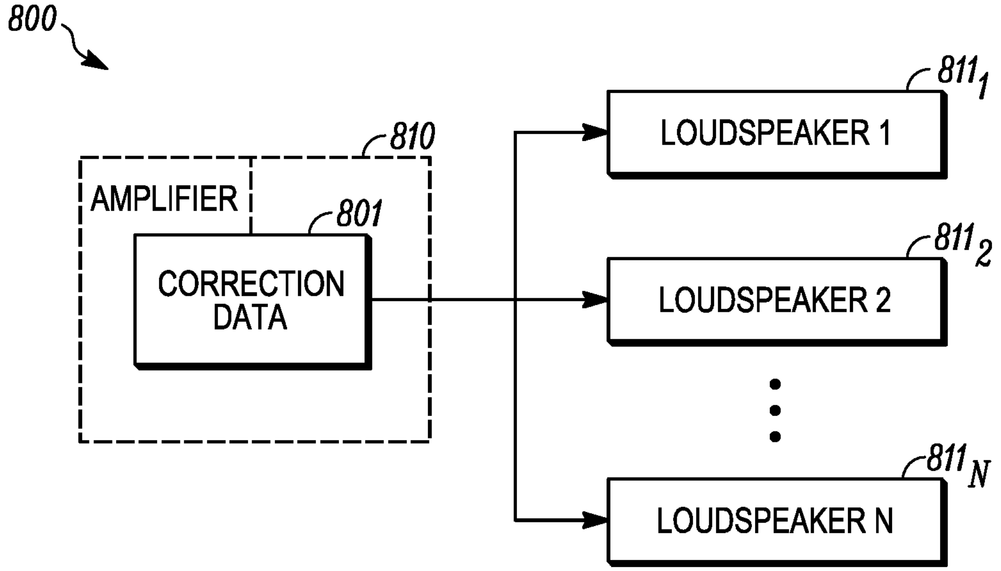
FIG. 8 shows a schematic view of a learning scheme for an audio system according to an embodiment.

FIG. 8 shows a system 800 using for using the nonlinear distortion correction parameters and the linear correction parameters developed by the RNNs described herein. A correction data source 801 stores the nonlinear distortion correction parameters and the linear correction parameters in a memory. The parameters may be downloaded to a loudspeaker 811$_1$ or a plurality of loudspeakers 811$_1$, 811$_2$, . . . 811$_N$ for use in correcting the nonlinear distortions and the linear distortions inherent in the speakers 811. The speakers 811 may be all of a same type and thus were modeled the same in the systems and methods described herein. Alternatively, the parameters for correcting distortion, both linear and nonlinear as set by the RNNs as described herein, are stored in the correction data source 801 that is part of an amplifier or signal conditioner 810. The amplifier 810 receives an audio signal and processes same, e.g., equalization, amplification, and like, including applying the parameters to correct distortion before bending an audio out signal to the loudspeakers 811. The loudspeakers 811 were the physical devices under test in the methods and systems described herein in this example.

In example embodiment, an audio system includes a physical system including a loudspeaker configured to produce audio in response to an audio input signal, a first recurrent neural network to correct for non-linear distortions from the loudspeaker, and a second recurrent neural network to predict performance of the loudspeaker receiving an output from the first recurrent neural network and to perform corrections on the first recurrent neural network. The first recurrent neural network receives the audio input signal and outputs a corrected audio signal to the second recurrent neural network and the second recurrent neural network outputs a cascade output signal. The first recurrent neural network outputs the corrected audio signal to a loudspeaker system model/actual loudspeaker that outputs a system output. A target linear transfer function is configured to receive the audio input signal and outputs a desired output signal.

In an example embodiment, a summing circuit is configured to sum the system output and the desired output signal to produce an error signal that is received as a control signal by both the first recurrent neural network and the second recurrent neural network.

In an example embodiment, the first recurrent neural network is a precorrector and the second recurrent neural network is a forward model RNN.

In an example embodiment, the precorrector is trained starting from the forward model RNN and correcting the forward model RNN using an error signal from the target linear transfer function to the forward model RNN.

In an example embodiment, the forward model RNN is trained using an error signal between an output from the physical system and an output from the forward model RNN.

In an example embodiment, the audio input signal is a multitone, sweep, overlapped log sweeps, and/or music signal.

The present disclosure is not limited to a specific type of loudspeaker or a particular type of feedback signal. For different loudspeakers the size and specific architecture of the RNN may vary. Furthermore, for different feedback signals minor changes might be required in the computation of the error signal. Additionally, a single RNN or combinations of RNNs can be used to correct loudspeaker arrays.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

We claim:

1. An audio system, comprising:

a physical system including a loudspeaker configured to produce audio output in response to an audio input signal;

an audio processor to output a processed signal to the loudspeaker, the audio processor including a recurrent neural network to correct for non-linear distortions from the loudspeaker, the recurrent neural network including a first recurrent neural network to correct for non-linear distortions from the loudspeaker and a second recurrent neural network to predict performance of the loudspeaker receiving an output from the first recurrent neural network; and an adaptive feedback system receiving an audio output from the loudspeaker and comparing the received audio output to a target to provide correction parameters to the recurrent neural network, wherein the recurrent neural network receives the audio input signal and outputs a desired output signal, and a summing circuit to sum the audio output and the desired output signal to produce an error signal that is received as a control signal by the recurrent neural network, the adaptive feedback system further configured to predict performance of the loudspeaker receiving an output from the first recurrent neural network and to provide corrective parameters to the second recurrent neural network.

2. The system of claim 1, wherein the recurrent neural network receives the audio input signal and outputs a corrected audio signal to the loudspeaker.

3. The system of claim 2, wherein the recurrent neural network outputs a drive signal loudspeaker.

4. The system of claim 3, wherein the audio processor applies a target linear transfer function to the input signal to produce the processed signal for the loudspeaker.

5. The system of claim 1 wherein the recurrent neural network is a precorrector.

6. The system of claim 5, wherein the recurrent neural network is trained using an error signal between an output from the loudspeaker and an output from a forward model.

7. The system of claim 1, wherein the audio input signal is a multitone, sweep, overlapped log sweeps, and/or music signal.

8. An audio system, comprising:

a loudspeaker that includes non-linear distortion and linear distortion based on an audio signal input to the loudspeaker;

non-linear distortion removal parameters developed from a first recurrent neural network to correct for non-linear distortions from the loudspeaker and a second recurrent neural network to predict performance of the loudspeaker receiving an output from the first recurrent neural network and correct parameters of the first recurrent neural network; and a summing circuit to sum the system output and the desired output signal to produce an error signal that is received as a control signal by both the first recurrent neural network and the second recurrent neural network;

circuitry to apply the non-linear distortion removal parameters to the audio signal in the loudspeaker.

9. The audio system of claim 8, wherein the circuitry is in an amplifier that sends an audio signal corrected by the non-linear distortion removal parameters to the loudspeaker to reduce non-linear distortions at the loudspeaker in response to the audio signal.

10. The audio system of claim 9, wherein the non-linear distortion removal parameters are in an audio signal correction matrix that are mathematically applied to an audio signal input to the amplifier that outputs a corrected audio output signal to the loudspeaker.

11. The audio system of claim 9, wherein the matrix includes linear distortion correction parameters that are mathematically applied to the audio signal input to the amplifier that outputs the corrected audio output signal to the loudspeaker.

12. The audio system of claim 8, wherein the first recurrent neural network receives the audio input signal and outputs a corrected audio signal to the second recurrent neural network and the second recurrent neural network outputs a cascade output signal.

13. The audio system of claim 12, wherein the first recurrent neural network outputs the corrected audio signal to a loudspeaker system model that outputs a system output.

14. The audio system of claim 8, wherein the first recurrent neural network is a precorrector and the second recurrent neural network is a forward model RNN.

* * * * *